July 19, 1949. S. K. MOXNESS 2,476,558
APPARATUS FOR MOLDING PLASTICS
Filed Feb. 23, 1946
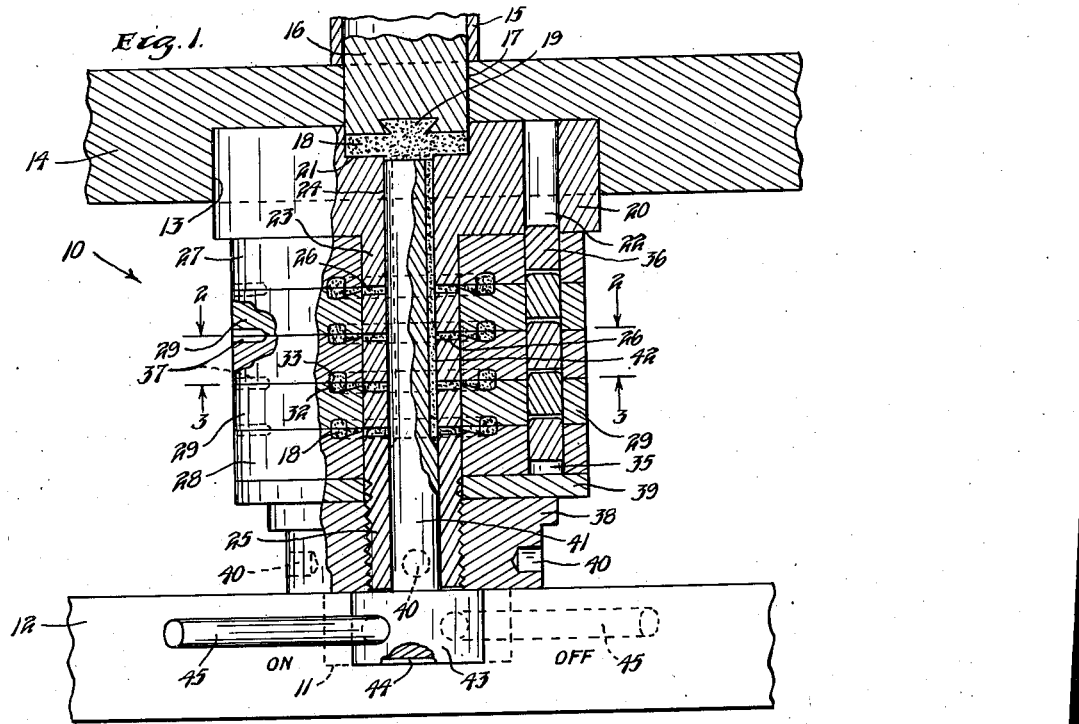
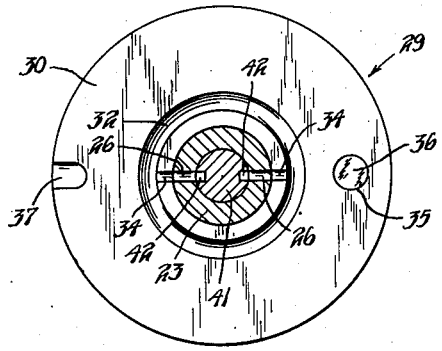
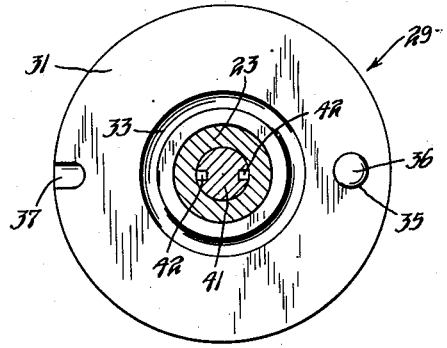
INVENTOR.
SVEN K. MOXNESS
BY
George H. Fisher
ATTORNEY Patented July 19, 1949

2,476,558

UNITED STATES PATENT OFFICE 2,476,558

APPARATUS FOR MOLDING PLASTICS

Sven K. Moxness, Minneapolis, Minn., assignor to Minneapolis-Honeywell Regulator Company, Minneapolis, Minn., a corporation of Delaware Application February 23, 1946, Serial No. 649,723

6 Claims. (Cl. 18—30)

My invention relates to an improvement in forming molded plastic articles. In particular, the invention is concerned with an improved apparatus by which articles may be formed from plastic material by molding.

In the practice of the art of molding plastics there exists a large class of materials used for molding which must be held under pressure for a variable length of time in order that the article may be tempered to permanently assume a desired condition. In certain instances, the tempering is attained by cooling while in others it is attained by baking or curing at a temperature which may be either constant or graduated, to give the desired permanent condition. In the prior art it has been the usual practice to maintain the mold in the press during the tempering period. The disadvantage of this procedure is that the press is in reality idle during the tempering period, thus reducing the output of the press.

My invention contemplates the use of a transferable mold of the type that may be considered as a self-contained pressure unit. By the use of a mold of this type, the plastic material may be introduced from a press under pressure, and the mold may then be closed or sealed without diminishing the pressure, after which it may be transferred from the press to a tempering condition. Thus, by the use of this procedure and apparatus the press is not held idle during the tempering period, and much larger production can be obtained from a single press, thereby eliminating the necessity of having several presses to obtain a given production.

In addition to the saving in equipment expense, another particular advantage of the present apparatus is that the article may be made in such a manner as to substantially reduce the amount of shrinkage in the finished product. Because it is essential to inject the plastic material into the mold at a relatively high temperature, the article when formed and cooled to ambient temperature and removed from the mold, will have shrunk in size. I have found that this difficulty may be obviated by introducing the plastic material into the mold under a pressure which is in excess of the normal elastic point of the plastic material, so that when the article is cooled under a self-contained pressure it will, when removed from the mold, expand sufficiently to counteract the shrinkage. Thus, the shrinkage factor is inversely proportional to the amount of pressure applied when introducing the plastic material into the mold, and by varying the amount of pressure applied in introducing the material, the degree of shrinkage may be correspondingly varied.

One object is to provide apparatus for molding plastic articles in which the plastic material may be introduced and transferred under self-contained pressure from the press to a tempering area.

Another object is to provide apparatus for varying shrinkage in plastic articles made by the injection process.

A further object is to reduce the equipment expense in a plastic molding process by providing relatively inexpensive transfer molds of a type adapted for self-contained pressure to reduce the operating time per article of the more expensive presses.

Other and further objects will become apparent from the following detailed description and claims, and from the appended drawing, in which:

Figure 1 is a side elevation of one example of the type of apparatus which may be used in performing the process described herein, with some parts broken away and others shown in cross-section;

Figure 2 is a cross-section taken on the line 2—2 of Figure 1, looking in the direction of the arrows; and Figure 3 is a cross-section taken on the line 3—3 of Figure 1, looking in the direction of the arrows.

The apparatus to be described hereinafter is generally applicable to the formation of molded articles from substances being of either natural or synthetic origin which are classified as "plastics." In the formation of articles from this class of substances by a molding process, the moldable plastic material is introduced or injected into the mold under considerable pressure. While certain methods of molding are conducted in such a manner that the article assumes its finished condition substantially instantly, other substances and processes require that the pressure be continued for a more or less prolonged period of time during which the material must pass through a transient condition before it arrives at a desired phase or condition which it will permanently assume. The process which constitutes the present invention is applicable to the latter condition. This transient condition may be either a cooling process or a baking or curing process, which can be conducted at either a constant temperature or at graduated temperatures. The period of time in which the material must be maintained under pressure will depend on the type of material used, or the thickness and dimensions of the article, and will in general extend from one minute to periods of thirty minutes or more, and is herein referred to as a "tempering" period. This period of time, however long or short it may be, represents the time when the source of pressure is not actively being exerted and is merely serving as a source of static pressure. When the source of pressure is an expensive and complicated unit such as is ordinarily used, the user is not deriving the greatest possible value therefrom and thus by substituting the relatively inexpensive apparatus disclosed herein, considerable economy is effected.

According to the present invention, a plurality of self-contained pressure devices are used in conjunction with a press in such a manner that one device may be filled with plastic material and closed while under pressure exerted from the press, after which the device is removed from the press under its self-contained pressure and is transferred to a tempering area. The tempering area may be an oven, a refrigerating means, or possibly the ambient temperature of the atmosphere. In any case, the device is allowed to remain with the plastic material being subjected to the enclosed pressure until the desired quality has been obtained. Thereafter, the device may be opened and the article removed. Thus, it will be apparent that where the method is applied to the mass production of molded articles, the expense of a plurality of presses is replaced by the comparatively cheaper devices which may be re-used after a simple operation.

Referring now to the drawing, and particularly to Figure 1, the general reference numeral 10 indicates a closable self-contained pressure unit for molding plastic rings according to the present method. The unit 10 is adapted for support in recess 11 of plate 12, and by means not shown, it may be moved into recess 13 of plate 14, which is a stationary portion of the press and is analogous to the upper platen of a conventional transfer molding press. A conduit 15 communicates with a supply of plastic material which may be located over the top of the upper platen of the press. A piston 16 is adapted to slidably move through the conduit 15 and enter an aperture 17 in the upper plate 14, to inject plastic material indicated by reference numeral 18 into the mold. Piston 16 is provided with a recessed lowered surface 19 whose purpose will be disclosed hereinafter.

The self-contained pressure unit 10 has a heavy circular member 20 which is adapted to fit into recess 13 of plate 14, and which is provided with a recess 21 in its top surface which coincides with aperture 17 in plate 14, to receive plastic material 18 injected by piston 16. Shown on the right side of member 20 is an aperture 22 which cooperates with position securing means to be disclosed hereinafter. Shown projecting downwardly from member 20 is a tubular extension 23 having a cylindrical center portion 24 and a lower threaded extremity 25. A plurality of apertures 26 extend through the opposite sides of tubular extension 23 to furnish communication with the cylindrical center portion 24.

Circumscribing the tubular extension 23 below member 20 are a plurality of mold plates. The upper plate 27 and the lower plate 28 are each smooth on one side where they abut the adjacent exterior members, but the several intermediate plates 29 each have mold surfaces on their opposite faces as shown in detail in Figures 2 and 3.

Referring now to Figures 2 and 3, surface 30 corresponds to the upper surface of plate 28 and also the upper surface of the several plates 29, while surface 31 corresponds to the lower surface of plate 27 and also the lower surfaces of the several plates 29. Surface 30 is provided with a circular recess 32 which cooperates with a similarly shaped recess 33 in surface 31, to provide the mold form for the plastic article which in the present disclosure is a circular ring. A pair of passages 34 which are more commonly referred to as "gates" provide communication between the apertures 26 of tubular extension 23 and recess 32 of surface 30. Each of the several plate members has an aperture 35 within which is secured a position indicating stud 36, so that the several pairs of plates including member 20 will always be secured together in an identical position, as it is essential that the apertures 26 in tubular extension 23 always coincide with passages 34 in the several plates to provide an entry for the plastic material. A slot 37 is provided in the edge of each of the surfaces so that a tool, such as a screw driver, may be inserted between the several plates to separate them after the molded article has been formed.

The several mold plates 27, 28 and 29 are secured on the tubular extension 23 by a cap member 38 which is separated from plate 28 by a washer 39. The cap member 38 cooperates with the threaded portion 25 on the tubular extension 23 and may be firmly secured in place by a tool which can be inserted in apertures 40 about the periphery of cap 38.

Referring now to Figures 1, 2, and 3, a valve structure is shown in the form of a rod 41 situated in the cylindrical center portion 24 of tubular extension 23. The rod 41 has a pair of longitudinal slots 42 positioned on opposite sides thereof which extend downwardly from the recess 21 to a point below the several apertures 26 in the tubular extension 23. Rod 41 is mounted at its lower end in an integral collar member 43 which is provided for rotatable movement in the recess 11 by a plurality of graphite filled grooves 44. Rod 41 is subject to considerable pressure from the plastic material which is injected through the top of the device as shown in Figure 1 and therefore any other bearing means for supporting the valve structure so that it may be made rotatable would be within the spirit of this invention. A manually operable handle 45 is connected to collar member 43 to provide for rotation of valve member 41 and longitudinal slots 42 through a 90° arc to act as a valve with respect to apertures 26 in tubular extension 23.

In operation, the process may be conducted as follows: the unit 10 is assembled and firmly positioned in the recess 11 of plate 12 beneath plate 14 with the valve mechanism 41 in the open position indicated by the legend "on." A quantity of plastic material 18 which in a particular example may be a rubber compound, is positioned within the container situated above conduit 15 and maintained at a temperature of approximately 300° F. The piston 16 is moved downwardly through the conduit 15 forcing a quantity of the plastic material 18 ahead of it through aperture 17 into recess 21 and then in the vertical slots 42 of valve rod 41, through apertures 26 of tubular extension 23 and passages 34 into the recesses 32 and 33 of the several plates 27, 28 and 29. The force exerted by piston 16 on the plastic material may be just sufficient to properly inject the plastic compound within the mold. However, where it is desirable to minimize the amount of shrinkage in the finished product, the pressure should greatly exceed the normal elastic point of the compound and may for example be as much as 15,000 pounds per square inch. After the pressure has been fully exerted, the valve mechanism 41 is moved to the "off" position by handle 45, and piston 16 is retracted. As the piston 16 is moved upwardly, the recessed lower surface 19 thereof will cause adhesion with the remainder of plastic material contained in recess 21 and the slotted portions 42 of valve 41, so that a substantial portion of the excess compound will be withdrawn from the mold by the upward movement of piston 16. The press is then opened and the unit 10 which is now sealed under its own pressure by the closing of valve 41 is removed and transferred as an integral unit to a tempering area. In the case of a rubber compound molded into a shape of the proportions of the ring structures shown in the drawing, it is necessary that the tempering or curing be continued at a temperature of approximately 300° for possibly ten minutes. Thereafter unit 10 is removed from the tempering oven and opened by unscrewing cap 38 and prying the respective plates apart by insertion of a tool in the slots 37 between the plates. If the plastic compound was injected into the mold at a pressure above the normal elastic point of the material, it will, when removed from the mold, expand to its normal condition, thus compensating for the normal shrinkage which would have occurred had the material been injected into the press at a lower pressure.

The specific temperature and pressure set forth in the example given above are not intended in any sense to limit the process to these specific conditions which are applicable to such compounds as natural rubber. Nor is the process limited solely for use with this one compound or those which are closely related thereto, for I have found that it is equally applicable to numerous other plastic materials and preferably to those which require a tempering period after the molding operation. I have found, however, that in the case of those synthetic compounds which are formed from polymerized polyamides, which are more commonly known as "nylon," that the temperature must be considerably higher and preferably in the vicinity of 525° F., while the pressure used should preferably be considerably less than 15,000 lbs. pressure per square inch. Other plastic compounds will in general require pressures and temperatures within the range given in the preceding examples.

The curing or tempering time at which the unit 10 must be maintained at its self-enclosed pressure will to a large degree depend upon the size of the article being formed and the particular conditions of tempering which will vary with different materials.

It should be understood that the process is not limited to the specific examples of material, temperature or pressure given herein, nor to the specific disclosure of the self-contained pressure unit. Any plastic material may be used which requires a period of tempering following its formation and the temperatures disclosed are those necessary in the one instance to maintain the plastic in a fluid condition, and in the other instance the most desirable curing temperature. Likewise, in the case of the self-contained pressure unit, mechanically operable means may be provided for moving the valve or assembling the device, and it will be readily recognized that the cooperating mold plates must be constructed to conform with the size and shape of the articles being molded. Therefore, I wish to be limited only by the terms of the appended claims.

I claim as my invention:

1. Apparatus for forming a molded article, comprising two mold members cooperable with each other to form a mold surface therebetween, said members each having a common central aperture, a hollow member communicating with a source of moldable material and being adapted to fit into the central aperture of said mold members, said hollow member having an aperture communicating with a gate to the mold surface in one of said mold members, and valve means including a rod having a longitudinal cut, positioned within said hollow member to admit moldable material through the aperture in said hollow member to said mold surface, said rod being rotatable on its central longitudinal axis to enclose the moldable material within said mold surface.

2. Apparatus for forming molded articles, comprising a plurality of members cooperable with each other in pairs to form a mold surface between each of said pairs of members, each of said pairs of members having a central aperture which is adapted to communicate with a source of moldable material, one of each of said pairs of members having a gate communicating between said aperture and said mold surface, and valve means including a rod having a longitudinal cut, positioned in the central aperture of said plurality of members, being adapted to admit moldable material through said longitudinal cut and said gates into each of said mold surfaces, said rod being rotatable on its central longitudinal axis to move said longitudinal cut away from said gates to enclose the moldable material within each of said mold surfaces.

3. In molding apparatus, the combination of mold members having apertures therein, cooperating surfaces on said mold members forming a mold cavity therebetween, a gate passage in one of said members between its cavity and its aperture, a hollow bolt extending through the apertures in said members and holding them together in sealed relationship, the wall of said bolt having an opening therethrough in alignment with said gate passage, and elongated valve means positioned in said hollow bolt and having a passage therein adapted to selectively establish or cut off communication between said opening and the exterior of said bolt.

4. In molding apparatus, the combination of a plurality of stacked mold members having apertures therein, cooperating surfaces on said mold members forming a mold cavity therebetween, a gate passage in one of said members between its cavity and its aperture, a hollow bolt extending through the apertures in said members and holding them together in sealed relationship, the wall of said bolt having an opening therethrough in alignment with said gate passage, and elongated valve means positioned in said hollow bolt and having a passage therein adapted to selectively establish or cut off communication between said opening and the exterior of said bolt.

5. In molding apparatus, the combination of a plurality of stacked mold members having apertures therein, cooperating surfaces on said mold members forming mold cavities therebetween, a gate passage in each pair of said members between their cavity and their apertures, a hollow bolt extending through the apertures in said members and holding them together in sealed relationship, the wall of said bolt having openings therethrough in alignment with said gate passages, and elongated valve means positioned in said hollow bolt and having a passage therein adapted to selectively and simultaneously establish or cut off communication between said openings and the exterior of said bolt.

6. In molding apparatus, the combination of mold members having apertures therein, cooperating surfaces on said mold members forming a mold cavity therebetween, a gate passage in one of said members between its cavity and its aperture, a hollow bolt extending through the apertures in said members and holding them together in sealed relationship, the wall of said bolt having an opening therethrough in alignment with said gate passage, and valve means positioned in said hollow bolt and having a passage therein adapted to selectively establish or cut off communication between said opening and the exterior of said bolt.

SVEN K. MOXNESS.

REFERENCES CITED

The following references are of record in the file of this patent:

UNITED STATES PATENTS

| Number | Name | Date |
| --- | --- | --- |
| 328,570 | Damm | Oct. 29, 1885 |
| 461,722 | Thurfelder | Oct. 22, 1891 |
| 1,606,705 | Joannides | Nov. 9, 1926 |
| 1,674,387 | Campbell | June 19, 1928 |
| 1,740,082 | Foerstner | Dec. 17, 1929 |
| 2,239,338 | Norelli | Apr. 22, 1941 |